United States Patent Office.

CHARLES ALEXANDER MARTIUS, OF BERLIN, GERMANY.

PRODUCTION OF MIXED AZO COLORING-MATTER.

SPECIFICATION forming part of Letters Patent No. 358,865, dated March 8, 1887.

Application filed March 17, 1886. Serial No. 195,592. (No specimens.) Patented in Germany January 26, 1886, No. 1,399; in England February 15, 1886, No. 2,213, and in France May 4, 1886, No. 160,722.

*To all whom it may concern:*

Be it known that I, CHARLES ALEXANDER MARTIUS, director of the Actiengesellschaft für Anilinfabrikation, of Berlin, in the Kingdom of Prussia, German Empire, have invented new and useful Improvements in the Production of Mixed Azo Colors; and I do hereby declare that the following is a full, clear, and exact description thereof, which will enable others skilled in the art to which it appertains to make and use the same.

I have found that the solutions of salts of tetrazodiphenyl or tetrazoditolyl in acting upon amines or phenols or sulpho-acids or carbo-acids, even when these substances are in excess, react in such manner that at first only one molecule of the tetrazo compound combines with one molecule of the amine, phenol, sulpho-acid, or carbo-acid. The first product obtained in such a way, containing still one free diazo group, is able to be combined again with the same or another amine, phenol, sulpho-acid, or carbo-acid, forming in this way a new azo color. A great variety of simple and mixed azo colors may be produced from the tetrazo compounds mentioned above.

The results of this invention show that the salts of the tetrazodiphenyl or tetrazoditolyl can give simple or mixed azo colors with the following classes of compounds:

1. Amines: (*a*,) primary amines, like aniline, toluidine, xylidine, alpha-naphthylamine, beta-naphthylamine, benzidine, tolidine, amidoazobenzol, amidoazotoluol, &c.; (*b*,) secondary amines, like diphenylamine, monomethylaniline, monoethylaniline; (*c*,) tertiary amines, like dimethylaniline, diethylaniline.

2. Sulpho acids of amines mentioned, sub. 1, as sulphanilic acid, naphthylamine-sulpho-acid, dimethylaniline-sulpho-acid.

3. Carbo-acids of the amines mentioned, sub. 1, as amidobenzoic acid, amidotoluol acid.

4. Phenol, as carbolic acid, cresol, alpha-naphthol, beta-naphthol, resorcine.

5. Phenol sulpho-acids, sulpho carbolic acid, alpha-naphthol-sulpho-acid, beta-naphthol-monosulpho-acid, beta-naphthol-disulpho-acid.

6. Phenol-carbo-acids, as salicylic acid, alpha-oxynaphthol acid, beta-oxynaphtoic acid.

The general process for producing such mixed azo colors consists in combining at first one molecule of the tetrazo compound with one molecule of the substances mentioned, sub. 1, down to 6, and combining this intermediate product further with one molecule of any one of the substances belonging to these six classes.

Simple colors—*i. e.*, such colors obtained by combining one molecule of tetrazo-compound with two molecules of the same substance of the six classes mentioned above—are already known and have been patented. To this class belong the colors known in commerce as "congo," "benzopurpurine," and "chrysamine."

I have already patented a process for the production of mixed azo colors from salts of tetrazodiphenyl and tetrazoditolyl, which consists in reacting with the intermediate product formed by the combination of one of these salts with an amine or an amido-sulpho-acid, a phenol, or a phenol-sulpho-acid upon another amine or amido-sulpho-acid. This patent refers to those combinations mentioned above, yet not patented.

The following examples may explain my process:

1. *Benzidine + alpha-naphthol sulpho-acid + alpha-naphthylamine-sulpho-acid.*—18 kilos of benzidine are converted in the well-known manner into the tetrazo compound. The solution of the same is poured into a solution of 24.6 kilos of alpha-naphthol-monosulpho-acid and 32 kilos of acetate of soda. If, now, a solution of 24.5 kilos of dry alpha-naphthylamine-sulphonate of soda in one hundred liters of water is added and the mixture stirred for a longer period, an azo color is formed which dyes cotton a brown-violet shade.

2. *Benzidine + beta-naphthol-disulpho-acid, R + beta-naphthylamine sulpho-acid.*—This color is obtained in the same manner as that described, sub. 1. 18.4 kilos of benzidine are added to 34.8 kilos of beta-naphthol-disulphonate of soda (R-salt) and 24.5 kilos of beta-naphthylamine sulphonate of soda.

3. *Tolidine + alpha-naphthol-sulpho-acid + beta-naphthol disulpho-acid R.*—The tolidine acts in a quite analogous manner as the benzidine. 21.2 kilos of tolidine, 24.6 kilos of alpha-naphthol-monosulphonate of soda, and 34.8 kilos of beta-naphthol disulphonate of soda (R) have to be used.

4. *Tolidine+alpha-naphthol-disulpho-acid+beta-naphthol.*—The naphthol disulpho-acid(R) in the example 3 can be replaced by the equivalent quantity of beta-naphthol, 14.4 kilos.

5. 18.4 kilos of benzidine are converted with muriatic acid and nitrite of soda into the chloride of tetrazodiphenyl and mixed in presence of acetate of soda with a solution of 19.5 kilos of sulphanilate of soda. A color is obtained which in an alkaline soap bath dyes directly a yellow on cotton.

The process in the example 1 may be also reversed by acting at first with chloride of tetrazodiphenyl upon salicylate of soda and afterward upon sulphanilate of soda.

In the examples 1 and 2 the sulphanilic acid or the salicylic acid may be replaced by the equivalent quantities of amido-benzoic acid.

Those dyes for the production of which alpha-naphthylamine, beta-naphthylamine or their sulpho-acids are used, and for which an application has been made already under the Serial No. 189,521, shall be excluded from the following claim.

What I claim is—

The process for the production of mixed azo colors, which consists in combining the intermediate product formed first by one molecule of tetrazodiphenyl or tetrazoditolyl or tetrazodixylyl and one molecule of an amine, amido-sulpho-acid, amido-carbo-acid, phenol, phenol-sulpho acid, or phenol-carbo-acid, as set forth.

CHARLES ALEXANDER MARTIUS.

Witnesses:
JOHN IMRIE,
CHARLES M. WERLE.